No. 654,253. Patented July 24, 1900.
H. C. HUNTER.
MACHINE FOR MAKING CANS.
(Application filed July 23, 1898.)
(No Model.) 11 Sheets—Sheet 1.
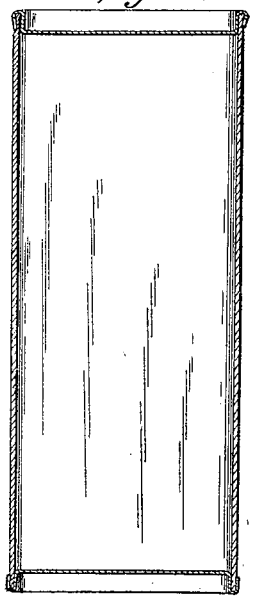
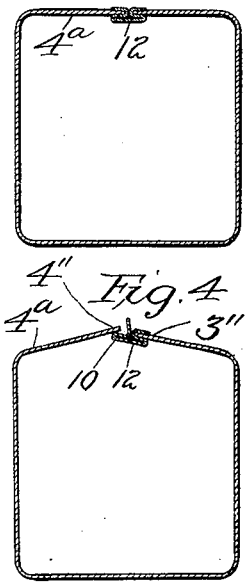
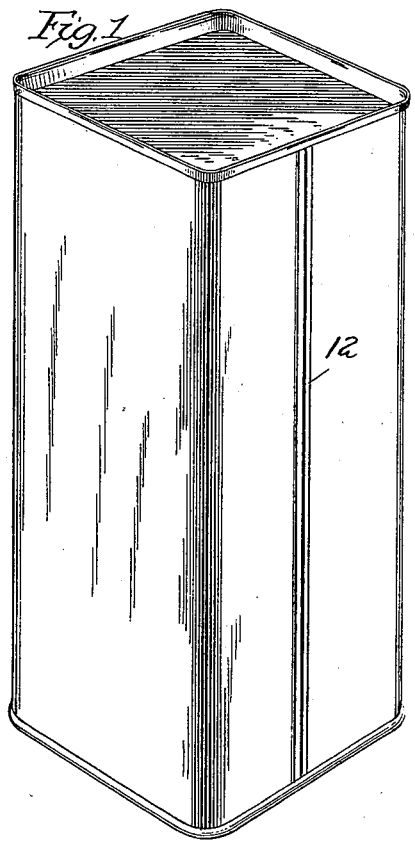
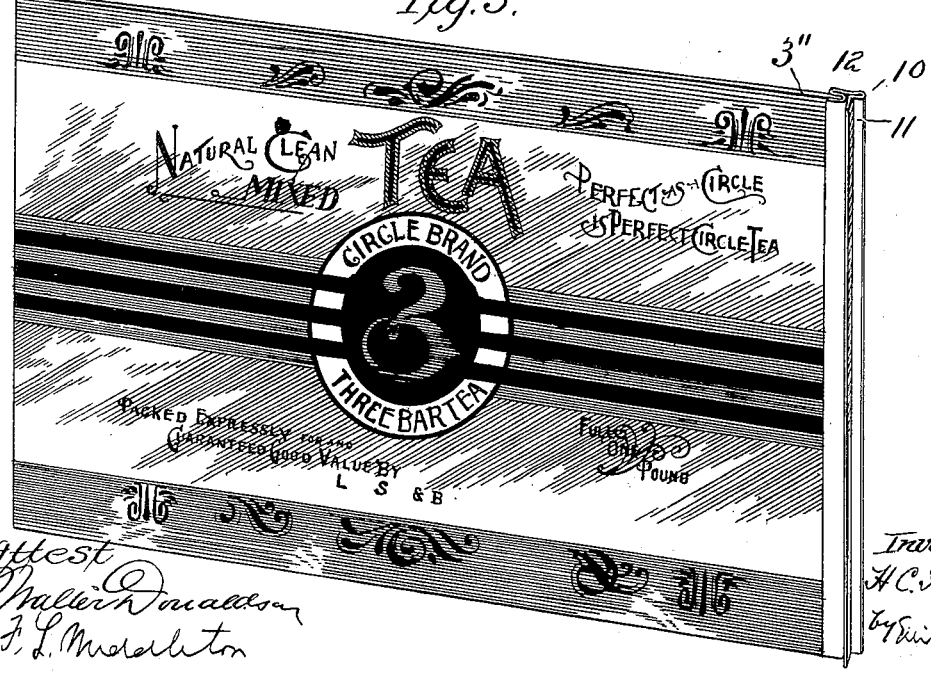

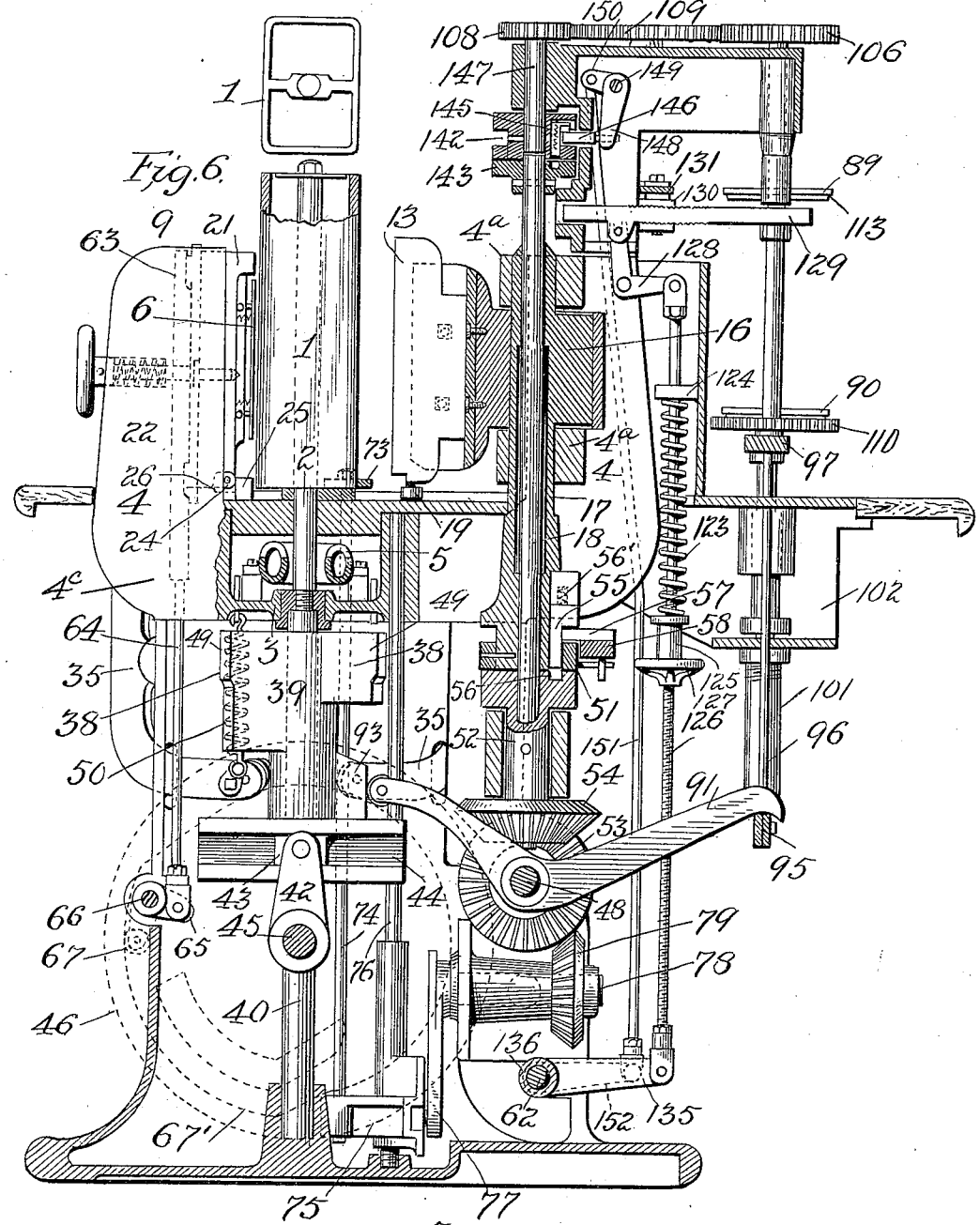

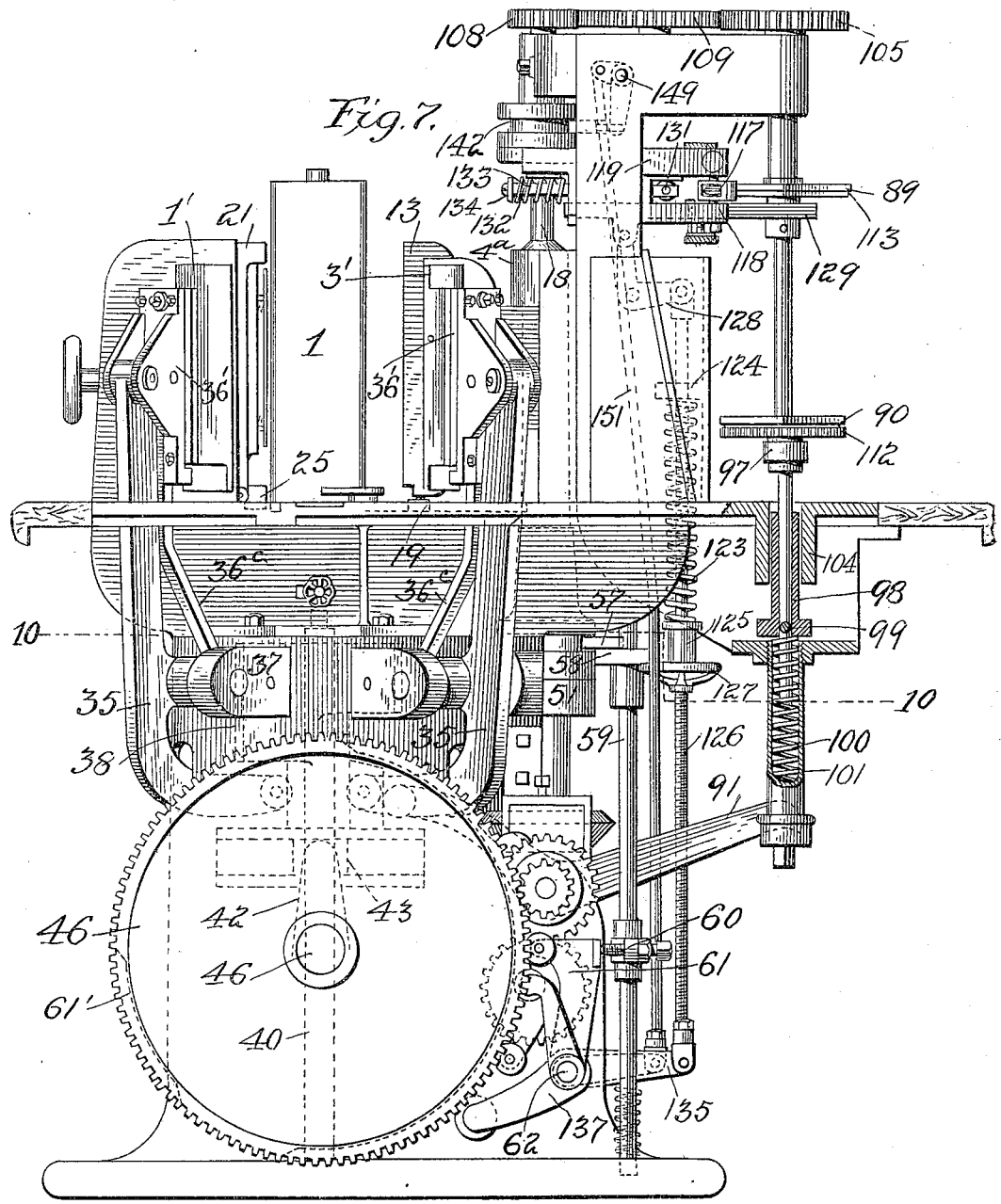

No. 654,253. Patented July 24, 1900.
H. C. HUNTER.
MACHINE FOR MAKING CANS.
(Application filed July 23, 1898.)
(No Model.) 11 Sheets—Sheet 4.
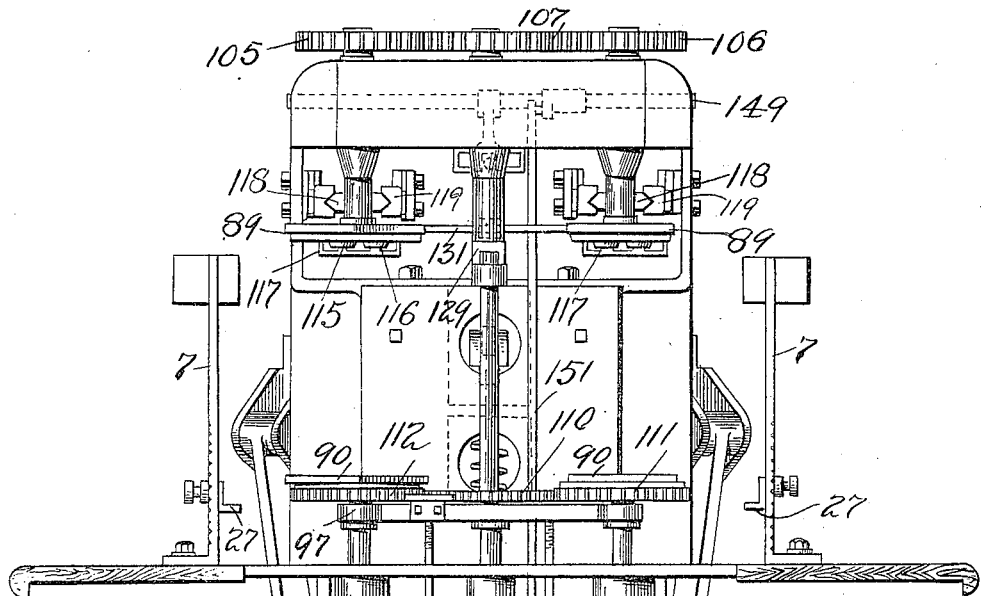
Fig. 8.
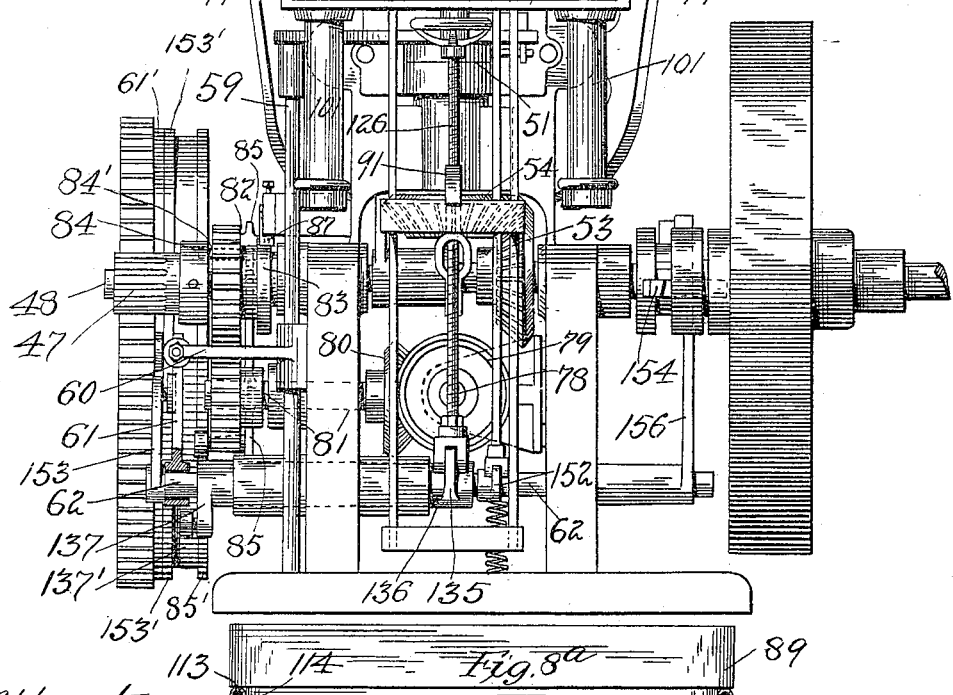
Fig. 8ᵃ
Attest
Inventor
Henry C. Hunter No. 654,253. Patented July 24, 1900.
H. C. HUNTER.
MACHINE FOR MAKING CANS.
(Application filed July 23, 1898.)
(No Model.) 11 Sheets—Sheet 5.
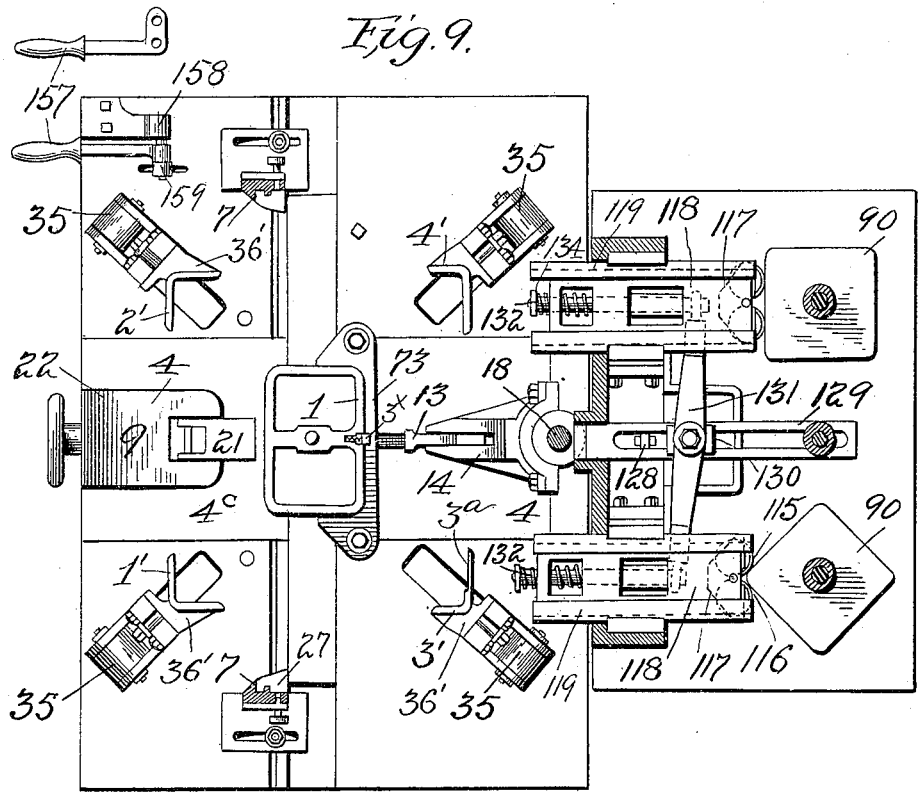
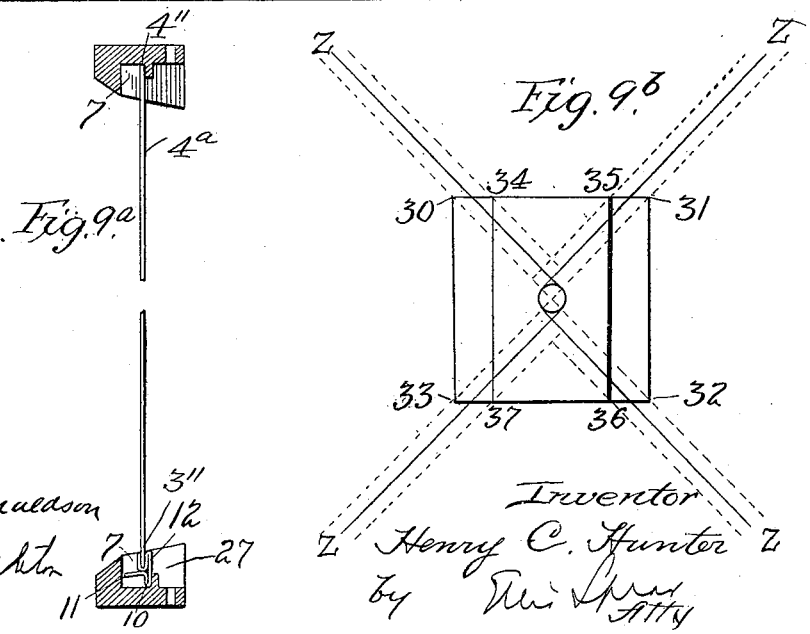
Attest
Walter Donaldson
F. L. Middleton
Inventor
Henry C. Hunter
by [his] Atty

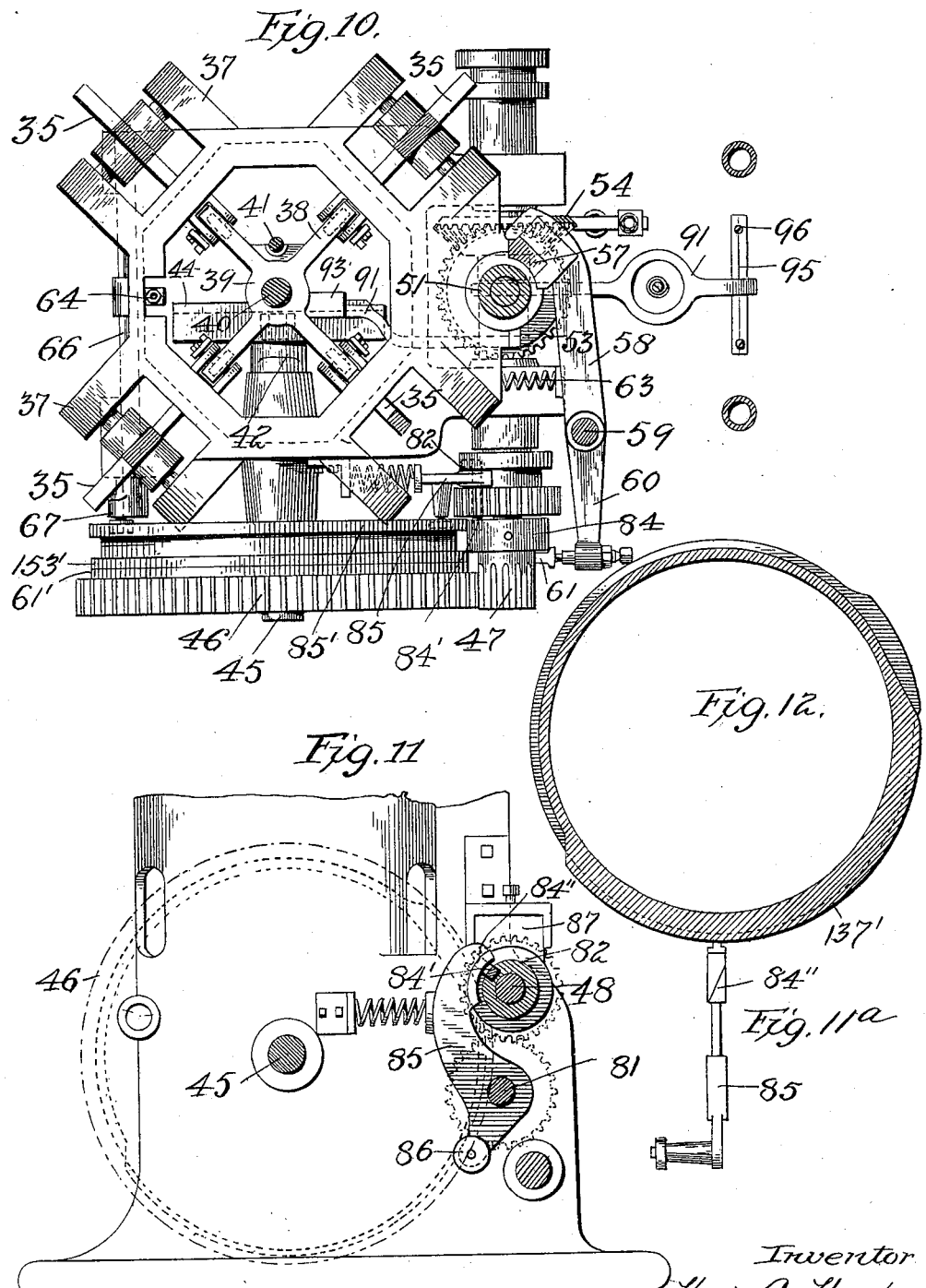

No. 654,253. Patented July 24, 1900.
H. C. HUNTER.
MACHINE FOR MAKING CANS.
(Application filed July 23, 1898.)
(No Model.) 11 Sheets—Sheet 7.
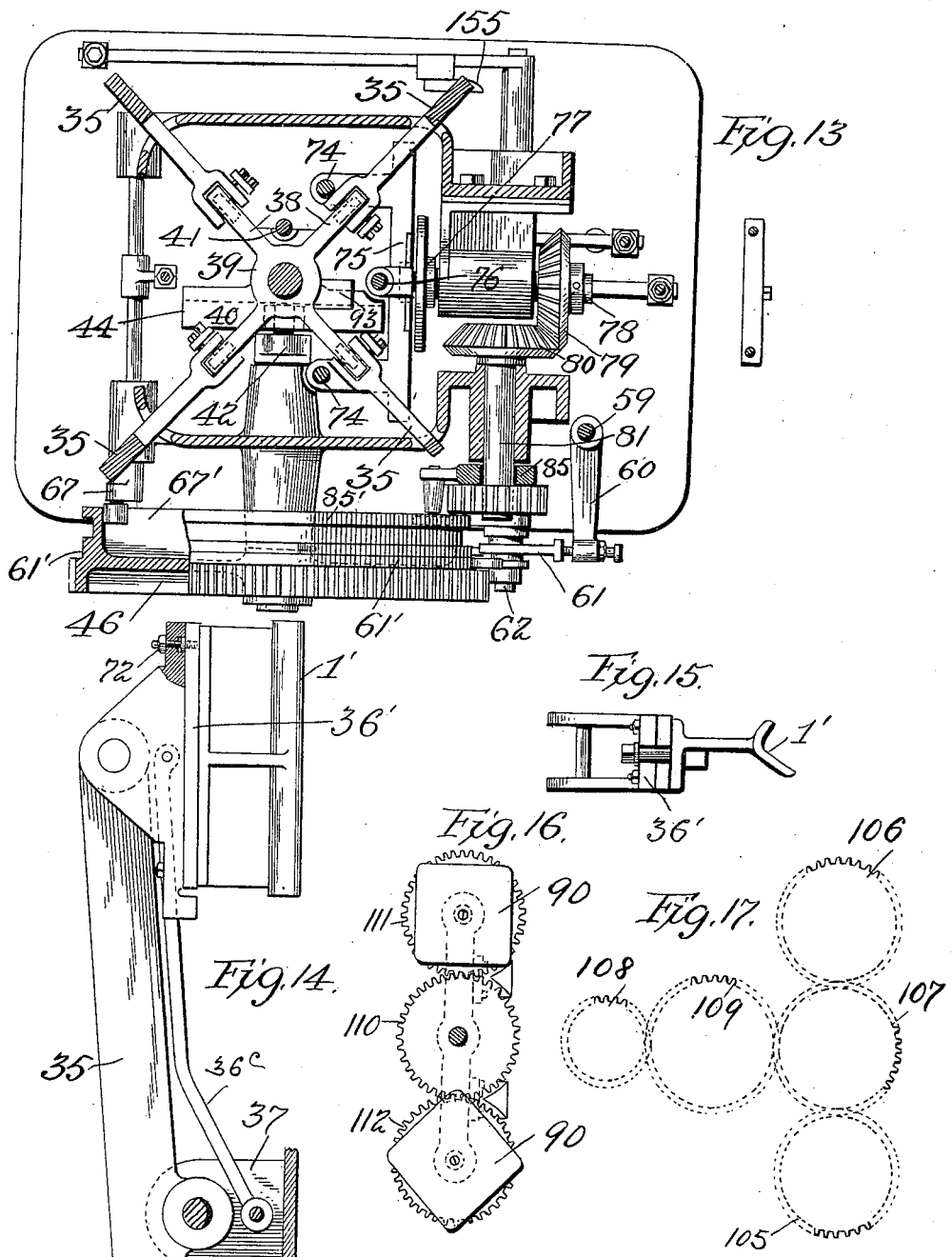
Inventor
Henry C. Hunter No. 654,253. Patented July 24, 1900.
H. C. HUNTER.
MACHINE FOR MAKING CANS.
(Application filed July 23, 1898.)
(No Model.) 11 Sheets—Sheet 8.
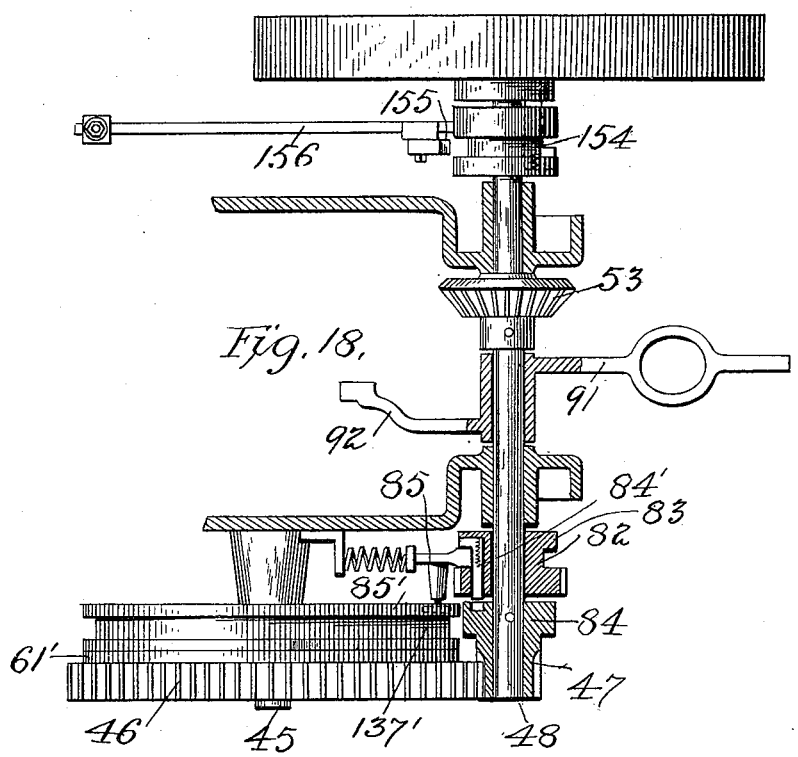
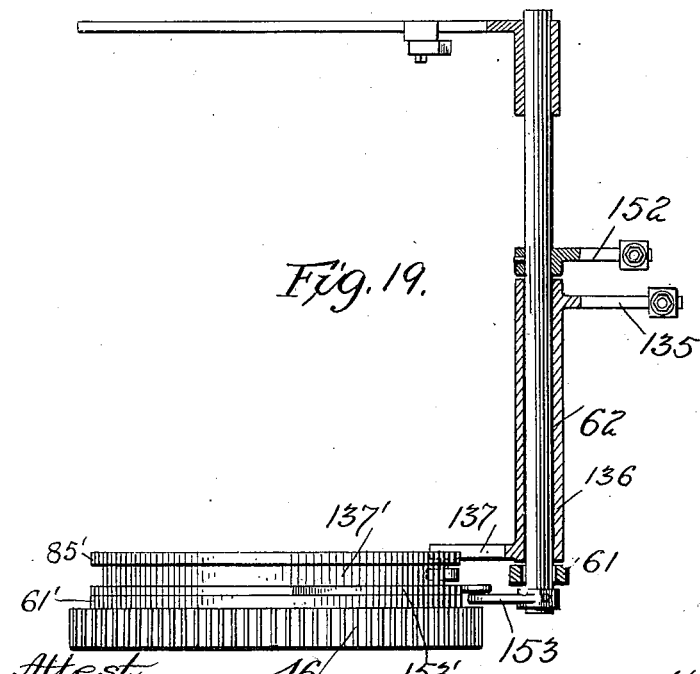

No. 654,253. Patented July 24, 1900.
H. C. HUNTER.
MACHINE FOR MAKING CANS.
(Application filed July 23, 1898.)
(No Model.) 11 Sheets—Sheet 9.
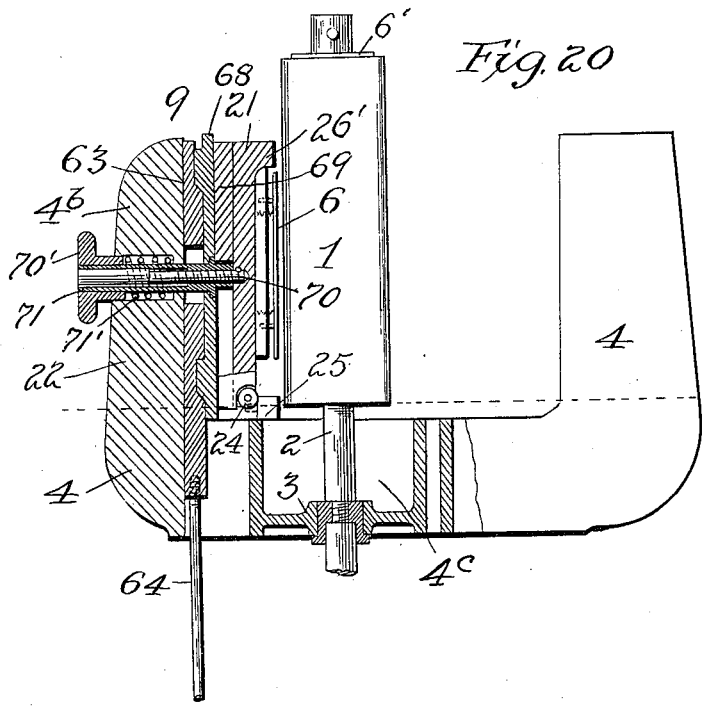
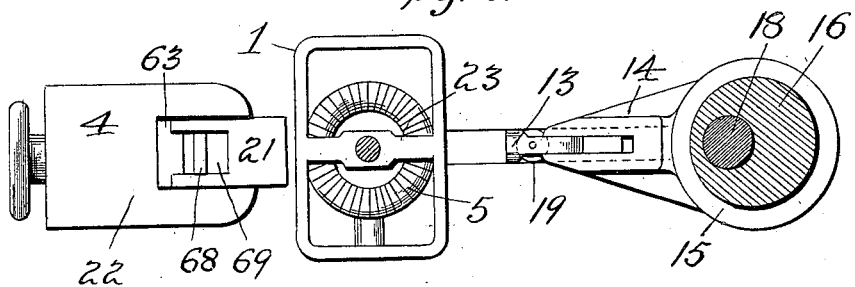
Attest
Walter Donaldson
F. L. Middleton
Inventor
Henry C. Hunter
by
Atty.

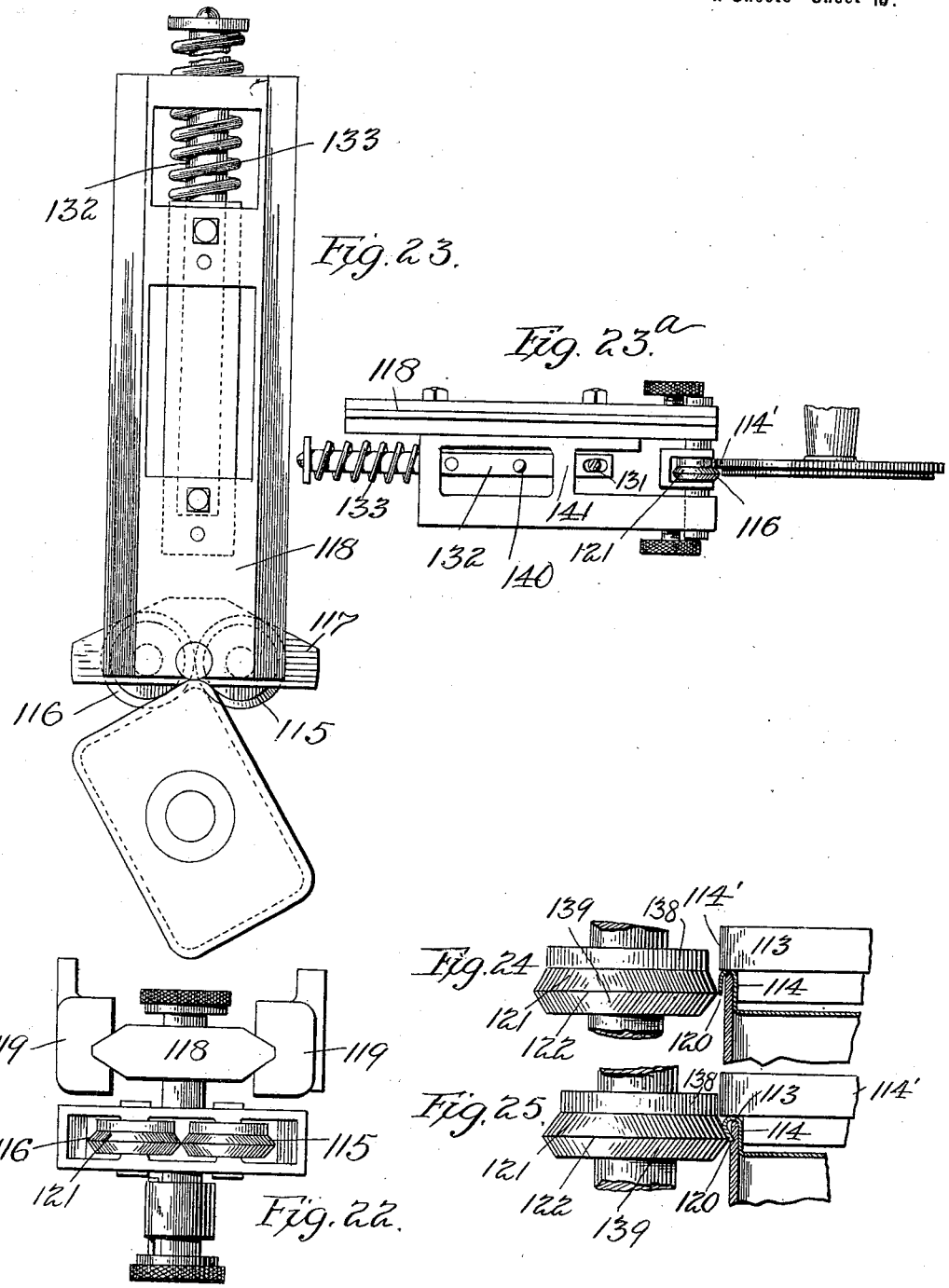

No. 654,253. Patented July 24, 1900.
H. C. HUNTER.
MACHINE FOR MAKING CANS.
(Application filed July 23, 1898.)
(No Model.) 11 Sheets—Sheet 11.
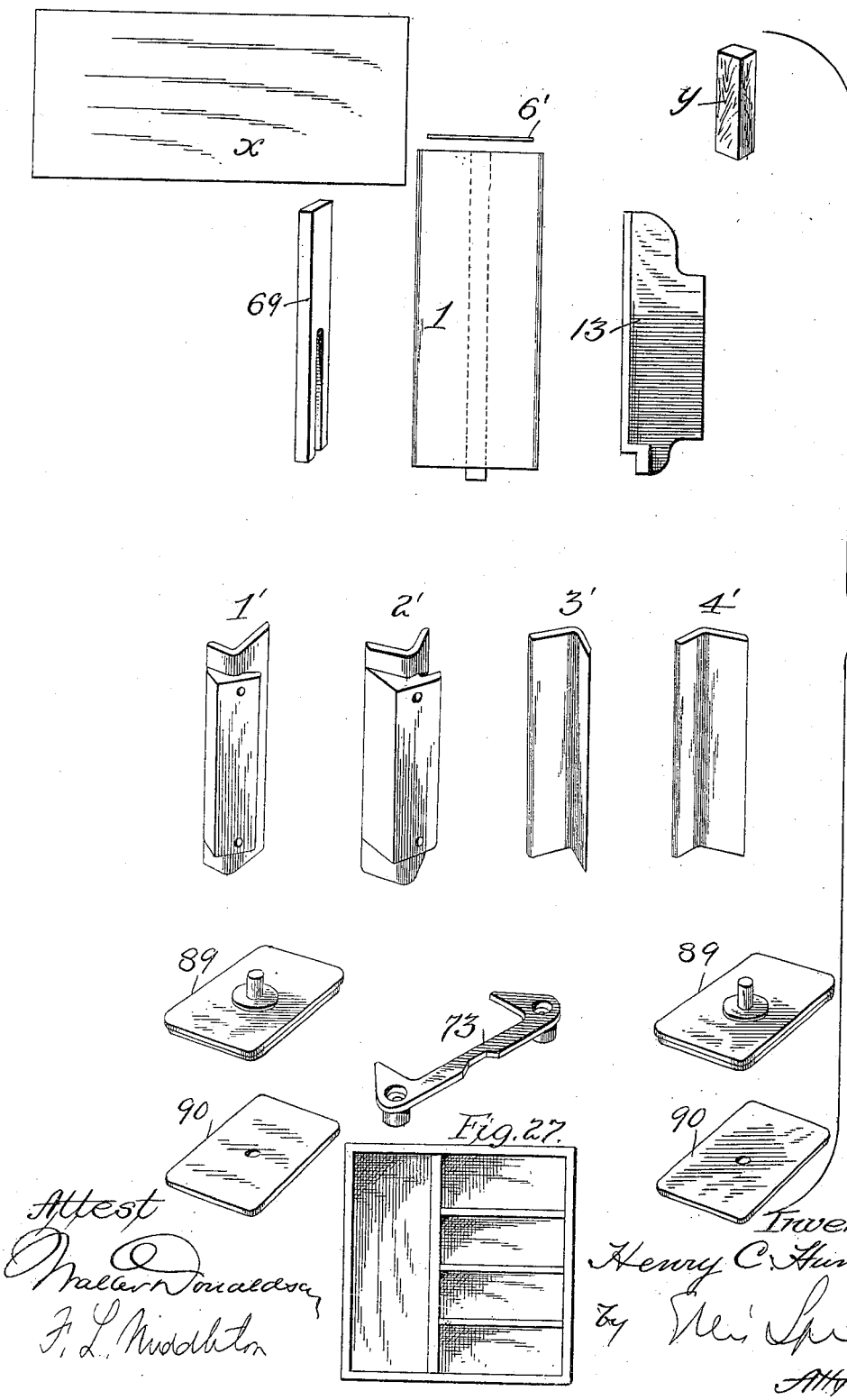

UNITED STATES PATENT OFFICE.

HENRY C. HUNTER, OF HAMILTON, CANADA, ASSIGNOR, BY MESNE ASSIGNMENTS, TO THE CANISTER MANUFACTURING COMPANY, OF PHILLIPSBURG, PENNSYLVANIA.

MACHINE FOR MAKING CANS.

SPECIFICATION forming part of Letters Patent No. 654,253, dated July 24, 1900.

Application filed July 23, 1898. Serial No. 686,732. (No model.)

*To all whom it may concern:*

Be it known that I, HENRY C. HUNTER, a citizen of the United States, residing at Hamilton, Ontario, Canada, have invented certain new and useful Improvements in Machines for Making Cans, of which the following is a specification.

My invention relates to machinery for making rectangular-shaped packing-cans composed of a body portion of fibrous material, a metallic head and bottom fastened thereon, and a metallic seaming-strip which extends along the flat side of the can and unites the edges of the sheet of fibrous material composing the body.

In the process of manufacture I use a body-blank consisting of a sheet of fibrous material having the seaming-strip secured thereto along one edge by a pair of gripping-flanges, a second pair of flanges on said strip being open and in position to receive the other or free edge of the body-blank when said blank is pressed or molded about the horn or forming-mandrel. This action of molding causes the free edge of the body-blank to fall into position between the open flanges of the seaming-strip, and these flanges are then subjected to pressure to unite the two edges of the blank by means of a hammer. The completed body is now removed from the horn, the metallic bottom is put on the body-blank and crimped thereon, and the can is then filled, after which the head is put on and crimped, so as to be firmly connected thereto.

In the molding process I heat the former or horn, and by this I secure a permanent and accurate set of the body-blank to the shape of the horn, and the body is stiffened by this process. I have found that with the aid of heat a more perfect can is produced and one that is more rigid and is free from cracks or breaks at the corners when a rectangular can is to be made, whereas should the blank be rolled, bent, or smoothed while cold the rigidity of the body would be decreased, the flat-sided appearance of the can would not be maintained after the body was removed from the horn, and the corners of the can-body would be stretched, cracked, or broken. In connection with this heated horn of rectangular shape I use a series of angular folders, one operating at each corner of the horn and at an angle of forty-five degrees to the planes of the sides of said horn. These angular folders operate in succession and mold the body-blank about the horn.

The packing-cans which the machine is designed to make are largely used for the purpose of receiving food products, many of which are in granular or powdered form loosely placed in the can intermixed with more or less air, and thus unavoidably with some moisture. Many articles of the class specified are in the course of time to some extent damaged by this moisture, and my machine, which is particularly adapted to be used in packing establishments where the can is at once used and in which the can is filled before the head is put on, is adapted to cause the can-body to take up the moisture, if there be any, after the sealing.

In the mechanism for crimping the metallic heads of the cans to the body I use a pair of crimping-rollers carried by an oscillating or rocking support, a spring for forcing the said rollers against the can with a predetermined yet yielding pressure, positively-acting means for retracting the rollers, and compensating means for controlling said rollers, which, together with their oscillating block and the spring-pressure, will insure regularity in the work notwithstanding the rectangular or irregular shape of the can and the fact that the rollers must operate first on the sides and then on the corners of the cans. These features of the crimping mechanism form the subject-matter of an application for Letters Patent of the United States of even date herewith, and in the present case my improvements, so far as the crimping devices are concerned, relate particularly to the means by which the heads of two rectangular or like-shaped cans are crimped simultaneously and in which the compensating means is controlled by the cans themselves, one can being set a part of a revolution ahead of the other, so that the crimping-rollers will be acting upon the corner of one can while the other rollers will be acting upon the side of the other can, said rollers being connected and controlled by a lever, which thus forms, in connection with the crimping-rollers, a compensating device to keep the pressure of the rollers on the can the same at the corners as it is at the sides without moving the main spring while at work.

The heated horn is set vertically, forming a chimney for the heating means, and this insures an even distribution of the heat on all sides.

In the accompanying drawings, Figure 1 is a perspective view of my rectangular fiber can. Fig. 2 is a vertical section of the same. Fig. 3 is a horizontal section through the can. Fig. 4 is a view similar to Fig. 3, showing the method of folding the sides of the can. Fig. 5 is an edge view of the body-blank with the seaming-strip attached before folding. Fig. 3 is a central vertical section through the machine from front to rear. Fig. $6^a$ is a plan view of the burner for heating the horn. Fig. 7 is a side view of the machine with parts in section. Fig. 8 is a rear view of the machine. Fig. $8^a$ is a detail of the upper chuck. Fig. 9 is a plan view with parts in section. Figs. $9^a$ and $9^b$ are views of details. Fig. 10 is a plan view of a section on line 10 10 of Fig. 7. Figs. 11 and $11^a$ are detail views of clutch devices. Fig. 12 is a detail view of a cam. Fig. 13 is a plan view of a section on line 13 13 of Fig. 8. Fig. 14 is a detail of one of the angular folders and its lever. Fig. 15 is a plan view of an angular folder. Figs. 16 and 17 are detail views relating to the can-holding chucks and the means for rotating the same. Figs. 18 and 19 are detail views along the principal shafts of the machine. Fig. 20 is a view of the horn or mandrel and the press-frame. Fig. 21 is a plan view of the horn, the hammer, and the press-block. Figs. 22, 23, and $23^a$ are detail views of the crimping-rollers. Figs. 24 and 25 are detail views of the crimping-roller and upper chuck. Fig. 26 shows the change parts of the machine by which the machine is adapted for making different sizes of cans. Fig. 27 is a plan view of the tray used for holding these change parts.

The horn 1, about which the fiber body-blank, Fig. 5, is folded, is supported by a king-bolt 2, extending above the table and up from a bearing 3 in the press-frame 4. The horn is hollow and, being set vertically, forms a chimney for the heating device 5, and the horn is thus equally heated on all its sides. A plate 6' partially closes the upper end of the horn to retain the heat. The body-blank, Fig. 5, is placed against the front of the former, with its edges resting in the adjustable guides 7 at each side of the horn. The central part of the blank is held against the horn by the spring-pressed clamp 6, carried by the presser 9. The folders 1' 2' 3' 4' are of angular form to fit the corners of the rectangular horn, and they operate diagonally of the horn or at about an angle of forty-five degrees to the planes of the faces of the horn. They mold the body-blank about the heated horn by successive actions, the folders 1' and 2' operating first to turn the ends of the blank across the sides of the horn rearwardly, and then the folders 3' and 4' in succession turn these ends of the blank toward the rear face of the horn, so that the free edge 4'' of the blank will fall into the space between the open flanges 10 11 of the seaming-strip 12, attached to the other edge 3'' of the blank, and these parts will then be in position to be flattened down by the seaming-hammer to complete the seam. This action of folding will be clear from Fig. 4, which shows the two last sections of the blank just before they reach the rear side of the horn. The proper engagement of the two last sections is rendered certain by holding the section 3'' of the blank so as to stand out at a slight angle to the rear face of the horn, so that the free inclined flange 11 of the seaming-strip will stand more nearly at a right angle to the face of the horn and will be out of the path of the edge 4'' of the free section $4^a$ of the blank when this is folded toward the horn. This relation of the parts when they have engaged with each other is shown in Fig. 4. The free edge 4'' is now bearing on the flange 10 of the seaming-strip, and when the parts reach the horn the edge 4'' of section $4^a$ will be fully up in the corner formed by the inclined flange 11 and the flange 10 of the seaming-strip. This makes a close joint and provides the maximum gripping-surface on the fiber body for the inclined flange to engage when this is flattened down. The section is held at the slight angle referred to away from the rear face of the horn by a yielding block or strip $3^\times$, Fig. 9, inserted in the rear face of the horn and normally projecting a slight distance therefrom to afford a bearing for the section 3''. The block is spring-pressed, and when the blow of the seaming-hammer comes upon the parts this block or strip recedes until its rear face is flush with that of the horn, thus presenting a solid wall, against which the seaming is done. The folder 3' may be cut away at $3^a$ to permit the section 3'' of the blank to assume this angular position, or the rear arm of the angular folder may be cut off or be made shorter for the same purpose. The flattening down of the inclined flange and the final compression of the seaming-strip are done by a hammer 13, carried in a holder 14, having an eccentric-strap 15 engaging an eccentric 16, formed with the vertical sleeve 17, Figs. 6 and 21, carried by the vertical shaft 18. After the folding action this hammer is advanced, and it first folds down the inclined flange 11 of the seaming-strip and then by a quick blow compresses the whole seam. The hammer has a roller 19 moving in a groove in the table, and this forms a pivot which, together with the eccentric which oscillates the rear of the holder, will give a lateral wiping effect to the hammer as it advances under the action of the eccentric, and this wiping effect will assist in the proper folding down of the inclined flange of the seaming-strip and the proper final compressed condition of the seam. A presser-bar 21 at the front of the horn sustains the blow of the hammer, and it is arranged in an upturned standard 22 of the press-frame 4, Figs. 6 and 20, and is operated against the horn at the same time that the hammer delivers its blow, and thus resists the same. The horn has a cross-web 23 in line with the hammer and presser, and this strengthens the horn in the direction of the pressure of both the hammer and the presser. The presser-bar has a roller 24 at its lower end engaging the table, and a removable block 25 is arranged in a groove in the table, with a pin 26 engaging a hole in the presser, so that when the presser is advanced this block will bear on the horn and sustain the lower part against the blow of the hammer, the presser having an upper point of contact at 26' to sustain the blow at the upper part of the horn.

The action of the angular folders operating opposite the corners of the horn and at angles of forty-five degrees to the body-blank is that of molding said blank to the rectangular or other shape having corners, and there is no stretching or smoothing action of the folders on the blank, and consequently the fiber of the board is not broken, cracked, or stretched, nor is the label injured. The heated former, in conjunction with the angular folders, will give a permanent set to the corners of the body-blank, which would not be the case were heat not used or were means used other than the angular folders, which simply press the blank at the corners. This heated horn generates steam from any latent moisture in the fiber board, and this aids in the molding action, and for securing the permanent set the dwell of the angular folders is intentionally made long enough to insure the complete drying out of the fiber of the body under the action of the heat from the horn. This drying action of the fiber body adapts it to receive the goods it is to contain as soon as the body is formed and the bottom is placed in position on the body. This drying of the fibrous body is highly essential where products such as chocolate, baking-powder, coffee, or tea are to be packed therein, as the dry fiber body will not in itself cause precipitation, but will take up any moisture which may be precipitated from said products, and thus damage on this account will be avoided.

The guides 7, which support the body-blank in front of the horn, comprise the posts, which have vertical grooves on their inner faces, Figs. 9 and 9ª, to receive the edges of the body-blank, and the rests 27, which are adjustable vertically on the posts and upon which the blanks are supported. By adjusting these the body-blanks may be brought opposite the center of the horn, the presser and hammer thus centralizing the body-blank and securing contact of the hammer throughout the seam. Fig. 3 shows the form of seam after the hammer has completed it.

The angular folders, as shown in the diagram Fig. 9ᵇ, operate along lines Z Z, parallel to but slightly offset from the diagonals of a square-shaped horn 30 31 32 33, so that the movement of the angular folders will be along a mean line between the lines of movement necessary for a square can and for an oblong can 34 35 36 37. This adapts the folding mechanism to different shapes of cans, as by changing the horn and the angular folders the means by which the angular folders are moved need not be disturbed. The means for operating the angular folders consist of the levers 35, carrying pivotally the shoes 36', to which the angular folders are attached, Figs. 9, 14, and 15, said levers being pivoted in ears 37 on the frame and having rollers on their lower inner ends, which ends extend below the wings 38 of a wedge-block 39, movable vertically on guide-rods 40 41, which extend from the base of the machine up to the press-frame 4, as indicated by Figs. 6, 7, 10, and 13. The wings are of different heights, as shown in Fig. 6, while the lower ends of the folding-levers are in the same horizontal plane, so that as the wedge-block moves down the folders will be moved toward the horn in succession, first the folders 1' and 2' and then the folder 3', and finally the folder 4', the latter placing the free end of the body-blank in the open flanges of the seaming-strip and making the lap ready for the seaming-hammer. The wedge-block is moved vertically by a crank 42, pivoted to a block 43, adapted to slide in a grooved cross-head 44 on the wedge-block, the crank being on a shaft 45, operated through the gear 46 thereon and a pinion 47 on the main driving-shaft 48. The wings of the wedge-block have short raised portions 49 for giving the final pressure to the folding-levers, and the dwell of the levers and angular folders is long enough to insure a permanent set of the molded corners of the body-blank in connection with the heated former. The folding-levers are returned to normal position when the wedge-block rises by springs 50, Fig. 6.

Evener-links 36ᶜ, Figs. 7 and 14, are pivoted to the shoes 36' and to the ears 37 in front of the pivots of the folding-levers 35, and they serve to even the movement and keep the face of the angular folder exactly parallel with the corner of the horn. Adjusting set-screws 72, Fig. 14, serve to fix the position of the angular folders relative to the shoes.

The sleeve 17, which carries the hammer-operating eccentric, is rotated intermittingly to give the seaming blow through a clutch, one member 51 of which, Fig. 6, is on a sleeve 52, pinned to the vertical shaft 18 and having a beveled gear 54 meshing with a similar gear 53, pinned on the main driving-shaft 48, so that the vertical shaft 18 and the clutch member 51 rotate constantly. The other member of the clutch on the sleeve 17 carries a pin 55, adapted to engage a hole 56 in the clutch member 51. Fig. 6 shows the clutch-pin as raised out of the hole by a crescent, Figs. 6 and 10, having an incline 57 to engage the head of the pin. The sleeve 17 and hammer are now at rest; but when the crescent is withdrawn the clutch-pin drops, aided by the spring 56', and the hammer is advanced to give a quick blow, is then returned, and is brought to rest by the release of the clutch-pin from the clutch member 51. The crescent is moved into the path of the head of the clutch-pin by an arm 58, carrying it, Figs. 7, 8, and 10, a vertical rock-shaft 59, carrying the arm, and a second arm 60 on the rock-shaft, which has an adjusting-screw engaging a roller-arm 61, pivoted loosely on a shaft 62, Figs. 6, 7, 8, and 13, and operated by its roller-bearing on the cam-surface 61' of the gear-wheel 46. The crescent is thrown out of action by the spring 63, Fig. 10, when the pressure of the cam 61' is relieved. The sleeve 17 bears in bosses 4ⁿ on the press-frame 4.

The presser 21 is operated against the horn by a wedge-slide 63, Figs. 6 and 20, which is moved vertically in a recess of the front standard 22 of the press-frame by a rod 64, connected to an arm 65 on a rock-shaft 66, which shaft has also an arm 67, Figs. 6, 10, and 13, operated from a cam-surface 67' on the inner side of the flange of the gear-wheel 46, the shape of said cam being indicated in dotted lines, Fig. 6. This wedge-slide operates against a wedge-plate 68, which bears against a filling-piece 69 between it and the back of the presser, Fig. 20. The presser is adjustable by a screw 70, fixed thereto and threaded through a sleeve 71, connected with the wedge-plate 68, said sleeve being turned by a hand-wheel 70'. A spring 71' tends to force the sleeve outward, and this keeps the wedge-plate pressed against the wedge-slide in all positions thereof. The wedge-slide is slotted to receive the sleeve, and the filling-piece is bifurcated to be dropped down over the screw. The filling-piece 69 is a change part for different sizes of cans.

It will be seen that the thrust of the hammer and of the presser is sustained by the press-frame, Figs. 6 and 20, and this is of U shape, having the massive standards at front and rear connected by the horizontal portion 4ᶜ.

The fiber body when completed is stripped from the horn by a stripper-plate 73, Figs. 6, 9, and 26, which is raised by two rods 74, extending up from arms on a grooved cross-head 75, movable vertically on a guide-rod 76, Figs. 6 and 13, and operated by a crank 77, having a block sliding in the cross-head, said crank being operated through a shaft 78, a gear-wheel 79 thereon, and a second gear 80 on the shaft 81, Figs. 8, 10, 11, and 13. This shaft is operated intermittingly through a clutch comprising a gear-wheel 82, loose on the main shaft and having a collar 83 fixed thereto, carrying a clutch-pin 84', Figs. 10 and 11, to engage a hole in the collar 84, fixed on the main shaft. The clutch-pin is spring-pressed, like the clutch-pin 55 before described, and it is retracted by a crescent 84'', which has an incline, Fig. 11ª, up which the head of the pin will ride when the crescent is in the path of the head of the clutch-pin. The crescent is on a lever 85, loosely pivoted on the shaft 81 and having a lateral arm, with a roller 86 engaging a cam-surface 85' on the gear-wheel 46. An adjustable brake 87, Figs. 8 and 11, is applied to the collar of the clutch to prevent excess of movement of the parts of the stripper mechanism.

After the body is formed the operator places a metallic bottom on said body and then places the can, minus the top, bottom side uppermost, between upper and lower chucks 89 90. The lower chucks have at this time been lowered for the ready introduction of the can by a lever 91, Figs. 6, 7, 8, 10, and 18, loosely pivoted on the main shaft, with its forward arm in the path of a supplemental wing 93 on the wedge-block before mentioned and with its rear arm engaging a cross-piece 95, secured to the rods 96, which connect with a cross-bar 97, in which the shafts of the lower chucks are journaled. Sleeves 98 are secured adjustably to the chuck-shafts by a screw 99, and springs 100, held in barrels 101, supported by the frame 102, press upwardly against the sleeves and tend to move the chuck-shaft, with the lower chucks, upwardly to grip the cans between the same and upper chucks. The sleeves and chuck-shafts pass through bearings 104 on the frame, Fig. 7. The spring exerts a predetermined pressure and the fiber can-body will be securely held, but will not be strained or damaged in any way. By loosening the said screw the chuck, with its shaft, may be moved up or down in relation to the sleeve to suit different sizes of cans; but in all adjustments of the cans the spring-pressure which holds the lower chuck against the can will be the same. The upper chucks are rotated through gears 105 106 on their shafts, which are driven from the intermediate gear 107, Figs. 8 and 17, and this gear 107 is driven from a pinion 108 through the gear 109. The shaft of the intermediate gear 107 extends downwardly, Fig. 8, and has the gear 110 meshing with gears 111 112, Figs. 8 and 16, connected with the lower chucks, to make the upper and lower chucks move in unison to prevent twisting the body of the can.

The crimping of the metallic bottom and head onto the fiber body is done in connection with the upper chuck, the lower chuck serving to hold the can against the upper chuck. The upper chuck is formed with an undercut shoulder 113, and the upturned rim of the bottom or head rests against this shoulder, the inner side of said rim bearing against the face 114 of the chuck, as in Fig. 8ª.

Crimping-rollers 115 and 116 are journaled in a block 117, which is swiveled in a carriage 118, moving in ways 119, fixed to the frame of the machine. The crimping-rollers are designed to act simultaneously upon the flange 120 of the bottom or head to force the same firmly into contact with the fiber can-body, as is shown in Figs. 24 and 25, and for this purpose the rollers have an inclined crimping-surface 121, ending in an edge 122 opposite the lower edge of the metallic flange 120. This inclined surface 121, together with the shoulder 113 and the face 114 on the chuck, forms the confined space, Fig. 25, in which the bead of the head is formed. The shoulder 113 forms a confining-bearing for the upper edge of the rim of the bottom or head, and when the crimping-roller is brought to bear upon the flange 120 the said flange will be forced inwardly and crimped into firm connection with the fiber body and the original form of the upper edge of the rim will be preserved, as the confining-shoulder 113, together with the bearing-face 114 and the inclined face of the roller, will form confining-walls for the rims and will prevent any distortion or any irregularities occurring from any force or pressure of the roller, and the only result of the crimping-roller will be to crimp the flange inwardly into the fiber body. The forward movement of the roller for the crimping action is given by a spring 123, bearing at its upper end against a lug or projection 124 on the frame and at its lower end against the sleeve 125, which is adjustable on the screw-rod 126 by a hand wheel and nut 127. The upper end of the rod connects with the bell-crank lever 128, Fig. 6, and this is connected to a slide-bar 129, carrying an adjustable block 130, to which a lever 131 is pivoted, Figs. 8 and 9, the ends of said lever engaging bars 132, which are carried by the carriages of the crimping-rollers and are arranged to slide therein, springs 133 being interposed between the carriages and disks 134 on the said slide-bars.

In action when the spring 123 is allowed to exert its force it depresses the rod 126 and through the bell-crank 128 moves the slide-bar 129, together with the lever 131, toward the can, thus drawing upon the bar 132 and through the springs 133 forcing the crimping-roller carriages to the rear to press the rollers against the flanges of the head or bottom, as the case may be. The spring 123, it will be noticed, is the primary means used in pressing the crimping-rollers to their work, and the force of this spring being accurately determined the pressure exerted by the crimping-rollers is just sufficient to press the metal flange into the fiber body.

In operating upon the body-blank of fibrous material it is essential that the crimping pressure exerted upon the metallic flange be sufficient to firmly unite the parts and that it be accurately determined in order to prevent cutting of the fiber and to secure uniformity of work, and it is also essential that this primary predetermined pressure be of a yielding nature in order to secure the most perfect results. This predetermined and yielding pressure I secure by means of the spring 123. In order to relieve the pressure, I employ positively-acting mechanical means for withdrawing the force of the said spring, consisting of an arm 135 on the sleeve 136, loose on the shaft 62, said sleeve having an arm 137, the roller of which is acted upon by a cam-surface 137', carried by the gear-wheel 46. After the crimping action has been performed this mechanical means will raise the rod 126, take off the pressure of the spring 123, and the crimping-rollers will then be free from pressure, though they may with their surfaces 138 bear lightly upon the upper face 114' of the chuck under the pressure of the spring 133. The rollers have an inwardly-inclined lower face 139, which will permit the ready insertion and guidance of the can to the shoulders 113 and 114 of the chuck, and when the can is inserted the spring 133 will yield to allow the crimping-rollers and their carriage to retract slightly. When the crimping-roller is being set up to its work, the spring-pressure is applied gradually. The force of the spring 123 is gradually exerted and applied through the lighter spring 133, and after this spring 133 has been compressed a pin 140 on the slide-bar 132 contacts with the bar 141 of the crimping-roller carriage, and then the full force of the spring 123 is exerted upon the carriage to force the crimping-rollers to their work. This gradual application of the spring-pressure is important, as it prevents any damage to the material, which might occur should the crimping-rollers be forced suddenly and with the full pressure against the head. After the pressure has been applied and the crimping-wheels set against the work the chucks are set in rotation through the described gearing from the clutch 142, Fig. 6, which comprises a clutch member 143, fixed to the shaft 18, before described, and having an opening to receive a pin 145 in the other clutch member when said pin is released from the wedge or crescent 146. Through this clutch the shaft 147 is driven, and this shaft carries the gear 108. The crescent 146 is controlled by an arm 148, connected thereto and fixed on a rock-shaft 149, which is operated through an arm 150, a rod 151, an arm 152, the shaft 62, Figs. 6 and 19, the arm 153 on said shaft, and a cam-surface 153', carried by the gear-wheel 46. The upper and lower chucks through the gearing described rotate in unison, and the lower chucks consist simply of plates 90, Fig. 26, which are secured to the lower gear-wheels and are adapted to permit the can-body, the bottom, or the head to fit over them. The chucks are open to receive the cans at the same time that the folding mechanism is open to receive and operate upon the body-blank.

The crimping-rollers are arranged in pairs in the oscillating blocks, and by this arrangement and the fact that they are under pressure they act perfectly in connection with a square, oblong, or like-shaped can having corners, as in turning the corners the movement of one roller will control that of the other and insure a uniform contact of the rollers upon the flange of the head. In passing the corners the blocks carrying the pairs of crimping-rollers simply rock upon their pivots and there is no tendency of the rollers to jump from the corners of the can. Both rollers act simultaneously upon the head, and a double crimping effect is thus secured for each revolution of the chuck, and this insures rapid production of the work with a comparative slow rate of rotation of the chucks.

In crimping the heads of square or like cans the crimping-rollers must necessarily move back and forth as they work upon the flat sides and corners of the cans, and this movement should be compensated for and prevented from affecting the pressure-applying means, so that said means may be constant and uniform in its action and that all parts of the can-head will be crimped uniformly whether at the corners or at the sides. This compensating means is interposed between the pressure-applying spring and the carriage of the crimping-rollers. From Fig. 9 it will be seen that the chucks are so set that the one at the right as viewed from the back of the machine has its flat side opposite the crimping-rollers, while that at the left has its corner opposite its crimping-rollers, one chuck being thus one-eighth of a revolution turned in relation to the other. This arrangement, together with the lever 131, pivoted midway of its length and connected at its ends, as described, with the crimping-roller carriages, constitutes in this form of machine the compensating arrangement, and as the pressure for forcing the crimping-rollers to their work is exerted through the slide-bar 129 and the pivot of the lever 131 it will be seen that the pressure at the rollers on both cans will be uniform, as when one end of the lever retracts for the passage of the corner of one can by the crimping-roller the other end of the lever will be moved forwardly, so that the rollers at that end will be forced with an equal pressure against the flat side of the other can, while the pivot of the lever 131 and the slide-bar 129 will not be affected at all and no back pressure will be imparted to the pressure-spring. It will be seen from this that the two cans, arranged one-eighth turn from each other, together with the oscillating lever 131, constitute a compensating means to prevent the reciprocating movement of the crimping-roller from affecting the pressure-applying device. The pivoted block of the lever 131 is adjustable in the slot of the slide-bar 129 to adjust for different sizes of cans.

The main shaft has a clutch 154, controlled by a crescent 155 on a lever 156, which is controlled from a hand-lever 157, Fig. 9, pivoted to a bracket 158, a rod 159 extending down from the lever 157 and connecting with the lever 156. It will be understood that the operator first puts the bottom on the can-body and places the can in the chuck with the bottom side up, and after the can is filled and the head put on it is placed in the other chuck at the rear of the machine, and while this head is being crimped the bottom is being crimped on a fresh can in the first chuck and at the same time a can-body is being formed in the folding mechanism, so that each can goes through the several steps of formation of the body, crimping of the bottom in one chuck and crimping of the head in the other chuck, after the contents have been put in the can.

Fig. 26 represents the change parts of the machine, and these are the only parts which need to be removed and replaced in order to change the machine from one size can to another, and these parts comprise the horn, with its top plate, the hammer, the filling-piece, which is inserted back of the presser, the four angular folders, the stripper, and the upper and lower chuck-disks. At $x$, Fig. 26, is shown a piece of tin which will act as a gage for setting the rests upon which the body-blanks are supported in front of the horn, and at $y$, Fig. 26, is shown a block by which the position of the lower chuck may be determined by inserting the block between the chuck and the table, these parts constituting the gage devices by which the rests for the body-blanks and chuck may be set to operate with the group of change parts shown in this figure.

I do not wish to limit myself to the use of the machine in making rectangular cans, as of course it may be advantageously used also in making round or curved cans.

The lever 131 constitutes a movable part of the compensating means, and this movable part is controlled by the rollers at the end thereof—that is, the rollers at each end of the lever act through said lever to control the crimping-rollers at the other end of the lever.

I claim—

1. In combination in a machine for forming can-bodies, the horn and a series of angular folders opposite the corners of the horn and operating toward and from the horn substantially along lines coinciding with the diagonals thereof and at angles of about forty-five degrees to the face of the body-blank, said angular folders acting to mold the body-blank at the corners of the horn and means for giving a successive action to the angular folders, substantially as described.

2. In combination in a machine for making cans from fibrous board, a hollow horn arranged as a chimney with heating means below the same, a series of angular folders arranged opposite the corners of the horn and operating along lines coincident with the diagonal of the horn and at angles of about forty-five degrees to the surface of the body-blank, said folders acting to mold the blank at the corners of the horn and means for operating the angular folders in succession, substantially as described.

3. In combination in a can-making machine, the horn, the clamp for holding the body-blank on the front face of the horn, and gages for supporting the ends of the body-blank at each side of the horn, and a series of angular folders arranged opposite the corners of the horn and operating along lines coincident with the diagonals of the horn and at angles of about forty-five degrees to the surface of the body-blank, said folders reciprocating independently of each other and being arranged independent of the clamp and means for giving the angular folders their reciprocating movement in succession, substantially as described.

4. In combination, the horn, a movable presser device at one face of the horn, a seaming-hammer operating upon the opposite face of the horn, and a plurality of pairs of angular folders operating at angles of about forty-five degrees to the face of the body-blank and opposite the corners of the horn to mold the corners of the body-blank, and means for operating the angular folders in proper succession, the presser operating at a point between the front folders and the hammer operating at a point between the rear folders substantially as described.

5. In combination, the horn, a series of angular folders operating substantially diagonally thereof opposite the corners, a presser device operating against one face of the horn and between the angular folders, a spring-clamp carried by said presser device, means for moving the presser toward and from the horn, a seaming-hammer operating upon the opposite face of the horn and between the angular folders with means for operating the said hammer, substantially as described.

6. In combination with a horn, the seaming-hammer, the presser having the upper bearing part and a bearing-block at the lower part of the horn, the intermediate spring-clamp for holding the body-blank to the face of the horn and the folders with operating means, substantially as described.

7. In combination, the hollow horn arranged as a chimney with a heating device below, the partition extending across the horn, the seaming-hammer on the one side of the horn, the presser on the other side of the horn, means for moving the seaming-hammer and presser in line with said partition and the folders operating at the intermediate parts of the horn with means for operating the same, substantially as described.

8. In combination, the horn, the folders arranged to operate successively in connection therewith and means for operating the same consisting of a wedge-block having radiating wings and operating-lever connections between said wedge-block and the folders, said lever connections being operated in succession by the wings of the wedge-block, substantially as described.

9. In combination, the horn, a series of folders operating in succession in connection therewith, the levers carrying the folders, and a reciprocating wedge-block having wings at different heights relative to the levers and operating the same in predetermined order, substantially as described.

10. In combination, the horn of substantially-rectangular shape, the folders operating at the corners of the horn, the levers for operating the folders, a reciprocating wedge-block for operating the levers in a predetermined order, said wedge-block having a cross-head and a crank having connection therewith, substantially as described.

11. In combination, the horn, the folding mechanism, a presser, a hammer operating upon the horn upon the opposite side from the presser and means for operating the presser consisting of a wedge-slide, a wedge-plate connected with the presser, means for operating the wedge-slide and a spring for returning the presser with an adjustable connection between said spring and the presser, substantially as described.

12. In combination, with the horn, a folding mechanism comprising folders, a presser for operating against one face of the horn, a seaming-hammer operating against the opposite face, means for operating the seaming-hammer and the presser, and a press-frame forming a resistance for the pressure of the seaming-hammer, substantially as described.

13. In combination, the horn, the folders, the seaming-hammer, a presser, means for operating the seaming-hammer and presser, and a press-frame comprising the base and upturned standards forming the bearings for the operating means for the seaming-hammer and presser, said press-frame resisting the pressure of the hammer and presser, substantially as described.

14. In combination, the horn, the press-frame having a base and upturned standards at opposite ends thereof, the king-bolt connected with the base of the press-frame for holding the horn, the cavity in the base of the press-frame, the heating device therein below the horn, the folders with means for operating the same, the seaming-hammer with means having bearings in one of the standards of the press-frame for operating the said seaming-hammer, the presser operating on the other side of the horn from the hammer and means having a bearing in the other standard of the press-frame for operating the presser, substantially as described.

15. In combination, the horn, the folding means, the seaming-hammer with means for operating the same, the press-frame having a base with upturned standards at its ends, the presser arranged in a cavity in one standard, means in said cavity for moving the presser toward the horn, a screw connected with the presser, a sleeve engaging the screw, and a spring arranged between the standard and a hand-wheel on the sleeve, substantially as described.

16. In combination, the horn, the folding mechanism comprising the folders, the levers carrying the same, the wedge-block for operating the levers, the crank and crank-shaft for operating the wedge-block, a gear-wheel 46 on the crank-shaft, means for operating the same, a seaming-hammer with operating means therefor, a presser and operating means therefor comprising the wedge-slide and a cam carried by the gear 46 with connections between the same and the wedge-slide, substantially as described.

17. In combination, the horn, the folding mechanism, and a seaming-hammer with means for reciprocating the same and giving it a wiping action on the seam consisting of an eccentric at the rear of the hammer connected therewith and a movable pivot near the front edge of the hammer, substantially as described.

18. In combination, the two pairs of chuck-disks for holding the two cans, the crimping-rollers acting simultaneously on the heads of the two cans, means for applying pressure to the crimping-rollers to force them against the can-heads and compensating means for the crimping-rollers, substantially as described.

19. In combination, two pairs of chuck-disks for holding two cans in different positions relatively to each other, crimping-rollers, means for applying pressure thereto to force them against the cans and a compensating device consisting of a lever pivoted intermediate of its length and connected at its ends with the crimping-rollers and connected also with the pressure-applying means whereby the roller at one can will be controlled through said lever from the roller at the other can and the pressure-applying means will not be affected by the reciprocation of the rollers in passing around the corners of the cans, substantially as described.

20. In combination, the two pairs of chuck-disks for the cans, the pairs of crimping-rollers one for each can, the oscillating blocks carrying the pairs of crimping-rollers to hold the rollers of each pair simultaneously against the cans, the carriages holding the blocks, the compensating lever connected with the carriages and a movable support to which the pressure-applying means is connected and upon which the compensating lever is adjustably pivoted, substantially as described.

21. In combination in a can-making machine, the horn, the folding mechanism comprising the folders, the reciprocating hammer, a sleeve, an eccentric for operating the hammer, a constantly-rotating shaft passing through the sleeve, a clutch between the sleeve and the constantly-rotating shaft with means for controlling the same, the chucks for holding the cans for the crimping action, the crimping-rollers with operating means therefor, the gearing for rotating the chucks and a clutch between the said gearing and the constantly-rotating shaft with means for operating the clutch, substantially as described.

22. In combination, the horn, the folding mechanism comprising the folders, the reciprocating wedge-block for operating the same having connections thereto, the crimping mechanism including the chucks with means for rotating them and connections for retracting one chuck disk from the other, said connections being controlled by the reciprocating wedge-block, substantially as described.

23. In combination, the horn, the folding mechanism comprising the folders with the wedge-block for operating the same, a seaming-hammer, a presser operating on the opposite side of the horn from the hammer, the crimping mechanism comprising the crimping-rollers and the chucks for holding the cans, means for rotating the chucks, a clutch for controlling the action of the seaming-hammer, a clutch for controlling the rotary means of the chucks and connections controlled by cams for operating the presser and for controlling the crimping-rollers, substantially as described.

24. In combination, the horn, the folding mechanism, and a stripper comprising a vertically-movable plate with means for operating the same consisting of a cross-head, a crank for operating the same, an automatically-controlled clutch mechanism for timing the operation of the crank to raise said stripper after the body has been molded, substantially as described.

25. In combination, the horn, the folders, the levers carrying the same, the reciprocating wedge-block, the crank and crank-shaft for moving the wedge-block, the gear-wheel 46 on the crank-shaft, the presser operating against one face of the former, means for operating the same controlled by a cam on the gear-wheel, a hammer, a sleeve having an eccentric for operating the same, a constantly-rotated shaft extending through the sleeve, a main shaft having gear connections with the gear 46 and with the constantly-operating vertical shaft, a clutch between the eccentric-sleeve and the vertical shaft, connections controlling said clutch and operated by a cam on the gear-wheel, the stripper, means for operating the same controlled by a clutch between the same and the main shaft, means for controlling the clutch operated by the cam on the gear-wheel, the chucks for holding the can for the crimping action, the gears for rotating the chucks, a clutch between the same and the constantly-operated shaft, means for controlling the clutch operated from a cam of the gear-wheel, a spring for setting the crimping-wheels to their work with means for relieving the spring-presser controlled by a cam on the gear-wheel, and connections for retracting one of the chuck-disks, said connections being operated by the wedge-block, substantially as described.

26. In combination, the vertical horn, the vertical angular folders, the vertical levers to which the folders are pivoted and the vertically-reciprocating wedge-block for spreading the lower ends of said levers, substantially as described.

27. In combination, the vertical horn, the vertical folders, the vertical levers pivoted intermediate of their length, means for operating the levers and the evener-links pivoted to the shoes of the folders and at points adjacent to the pivots of the vertical levers, substantially as described.

28. In combination with the horn and folders with operating means, the seaming-hammer, an eccentric for operating the hammer and a clutch for controlling the action of the eccentric with automatically-operating means for controlling the clutch to operate the hammer after the blank has been folded, substantially as described.

29. In combination, in a can-making machine, a horn, folding-arms, a seaming-hammer, and the yielding block or strip projecting from the rear face of the horn to afford a bearing for the last sections of the blank, substantially as described.

30. In combination, in a machine for forming can-bodies, a horn, and a plurality of pairs of folders disposed about the horn conforming to the shape thereof and operating parallel thereto, said folders acting at angles of about forty-five degrees to the body-blank to mold the same to the face of the horn and means for moving the folders in succession and maintaining their angular relation in said movement, substantially as described.

31. In combination, the horn, a clamp on one side, a seaming-hammer on the other side, and a plurality of pairs of folders disposed about the horn the members of said pairs being arranged at opposite points said opposite folders operating at angles of about forty-five degrees to the face of the blank in line with each other and at points intermediate of the clamp and hammer and means for operating the folders in succession to secure a molding effect on the blank.

32. In combination, two pair of chuck-disks, crimping-rollers acting simultaneously on the heads of the two cans, means for applying pressure, to the crimping-rollers to force them against the can-heads and compensating means for the crimping-rollers, said chuck-disks being of a form to hold cans of rectangular or like shape, substantially as described.

33. In combination in a machine for forming can-bodies, a horn and a plurality of folders disposed about the horn at different points, and operating parallel to the face thereof, means for moving the folders in proper succession and along straight lines passing through the horn whereby a molding effect on the blank is secured, said blank being presented by one folder to the molding action of the next and a hammer for securing together the meeting edges of the molded blank, substantially as described.

In testimony whereof I affix my signature in presence of two witnesses.

HENRY C. HUNTER.

Witnesses:
J. W. TERRY,
H. C. GWYN.